Aug. 17, 1954  A. D. RICIGLIANO ET AL  2,686,412
DRY CLEANING APPARATUS
Filed Dec. 1, 1950  2 Sheets-Sheet 1
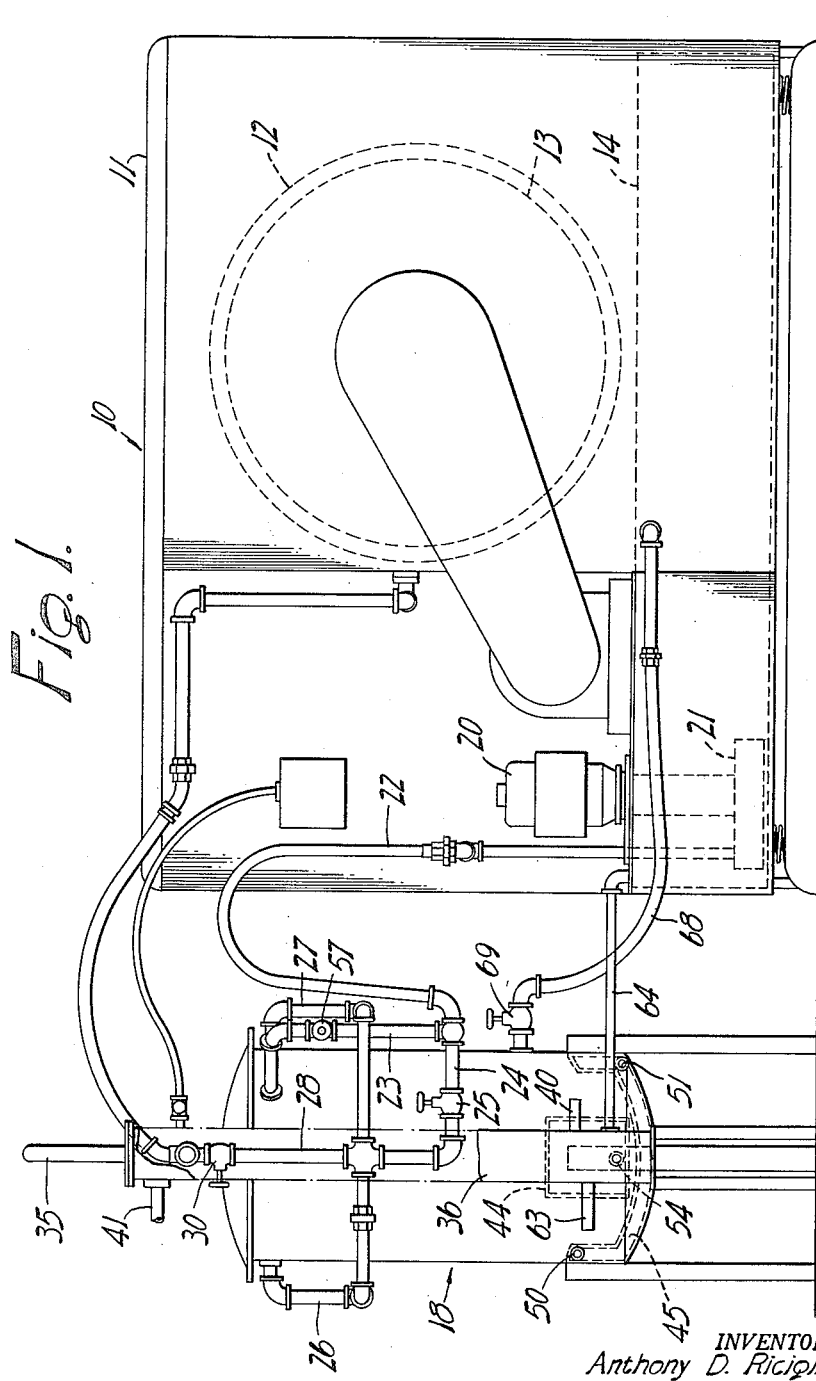
INVENTOR.
Anthony D. Ricigliano &
BY  William J. Fischer
Bean, Brooks, Buckley & Bean.
ATTORNEYS

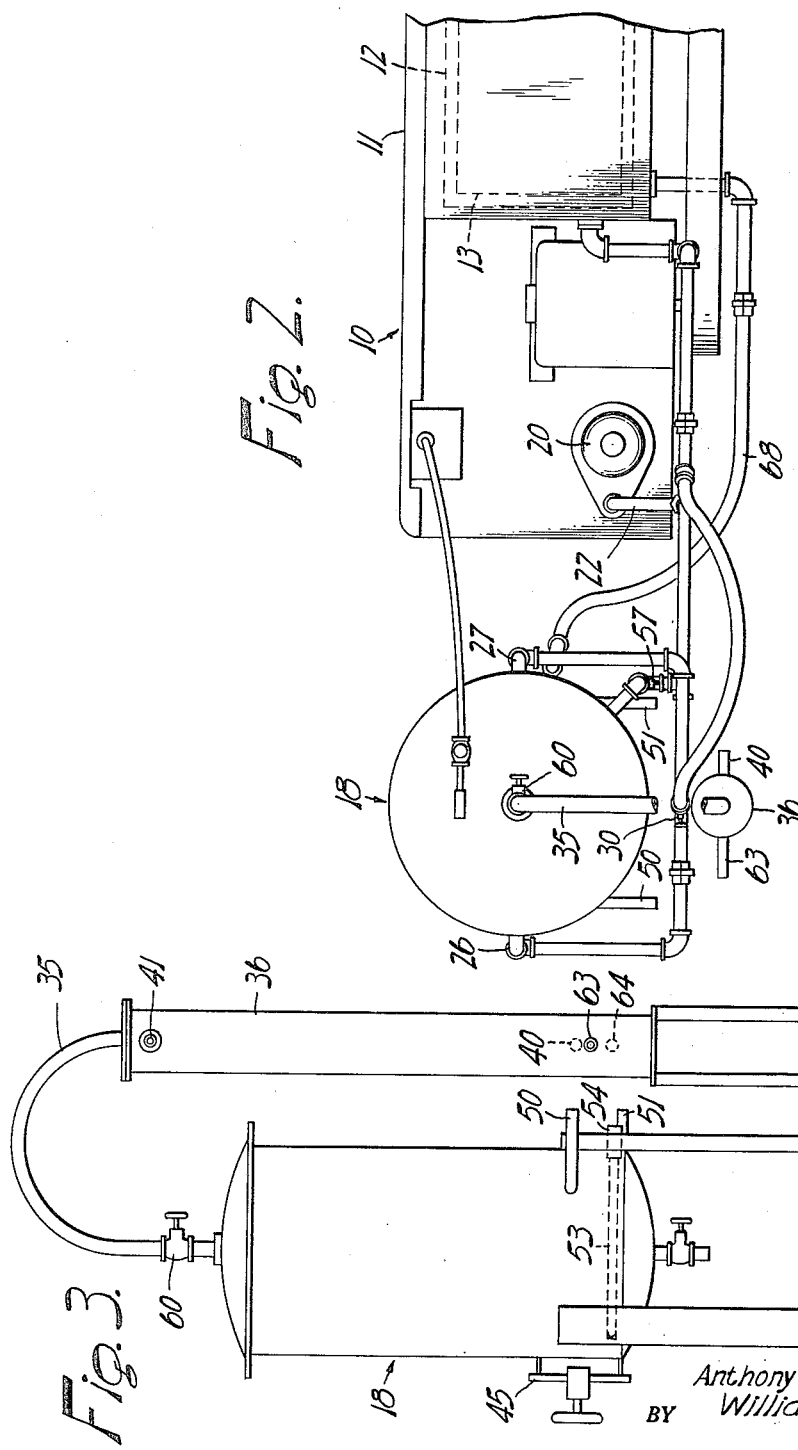

Patented Aug. 17, 1954

2,686,412

UNITED STATES PATENT OFFICE 2,686,412

DRY CLEANING APPARATUS

Anthony D. Ricigliano and William J. Fischer, Buffalo, N. Y., assignors, by mesne assignments, to The American Laundry Machinery Company, Cincinnati, Ohio, a corporation of Ohio Application December 1, 1950, Serial No. 198,704

6 Claims. (Cl. 68—18)

This invention relates to so-called dry cleaning machines for clothing and other fabrics, and particularly to a novel method and apparatus for filtering the solvent and recovering solvent directly from the filter by distillation.

Dry cleaning machines of the so-called closed-cycle type are well known. In such machines a perforated cylinder or drum which holds the garments or other articles is generally rotated in a chamber containing solvent and after the wash cycle the solvent is drained into a tank in the base of the machine. The drum is then rotated rapidly to centrifuge the garments and extract the residual solvent therefrom. In such installations the dirty solvent in the tank is pumped to a filter and after filtration is returned either to the tank or to the drum chamber. Filtration may be whole or partial, in the latter case the solvent pumped from the tank being partially delivered to the filter and partially to the drum chamber.

Filters of the general type contemplated here are well known and a typical filter of the rectangular type is shown in United States Letters Patent No. 2,359,158, dated September 26, 1944, to John E. Martin. Filters of the vertical cylindrical type for this general purpose are illustrated and described in detail in United States Letters Patent No. 1,919,448 to V. C. Norquist et al., dated July 25, 1933, and No. 2,013,776 to J. Weisman, dated September 10, 1935.

In such filters there are filter bags which are coated with filter powder at the beginning of a filtering operation and after about a week it becomes necessary to clean the filter. This is conventionally done by reverse flushing solvent through the filter which washes the filter powder and accumulated dirt and impurities into a sludge tank at the bottom of the filter, the filter powder carrying with it the accumulated dirt from the filter. In some types of filter apparatus the bags are replaced by metal plates, usually finely perforated Monel metal, and mechanical scrapers are used to clean the plates, instead of the reverse flushing usually practiced with bag type filters.

In this operation the filter powder thus washed into the sludge tank absorbs about three times its own weight in solvent, and, in the case of so-called synthetic dry cleaning machines, where one commonly used solvent is perchlorethylene, the cost of the solvent is considerable and the foregoing method of cleaning the filter is very uneconomical. Nevertheless, it is the most widely used method because nothing better or more economical has presented itself despite the considerable period of operation in the foregoing manner.

It is to be understood that in the prior art filter cleaning method, after the reverse flushing, the bags are again coated with filter powder before operation is recommenced.

The present invention provides apparatus and a method which, speaking generally, comprises means whereby the contents of the filter are periodically distilled within the filter itself so that the solvent which is absorbed in the dirt, or filtering aids if any are used, is driven off, condensed, and returned to the tank of the dry cleaning machine for reuse. In this new method the use of filter powder or other filter aid material may be entirely dispensed with, and the sole filtering media may be the bags themselves and the dirt which deposits on the bags.

In this operation the residue which collects in the sludge tank of the filter is in the form of a sirupy liquid which still contains appreciable quantities of perchlorethylene or other solvent. This residue may be removed, and the solvent therefrom recovered in other ways, but in a preferred form of the invention means are provided in the sludge tank of the filter for steam scouring this sirupy residue to rapidly and thoroughly dilute the same and thus further drive off and distill additional solvent leaving only the filter powder, dirt and other impurities and negligible quantities of solvent.

In the operation of the apparatus and method of the present invention, in the form set forth herein by way of example, the foregoing distillation is accomplished entirely within the filter and without resort to other extraneous distillation apparatus. However, under certain conditions or as a matter of preference other distillation steps or apparatus may be added as adjuncts and other filter purification treatment may be used to supplement the basic purification method of the present invention without departing from the underlying principles. In practicing the method of the present invention and before distillation within the filter, it is preferable to drain a part of the liquid contents of the filter back to the base tank before distillation.

In one preferred method of practicing the invention about one-fourth of the solvent is drained from the top of the filter before distillation. This is done partly to allow space above the solvent in the filter to accommodate a head of steam and to prevent solvent from boiling over into the condenser in the liquid phase, also to prevent froth which forms during the distillation from passing over into the condenser.

It will be seen from the foregoing that the present method and apparatus not only is more economical from the standpoint of solvent recovery, but also makes it possible, where desired, to save entirely the cost of the filter powder usually considered essential in the filtration of solvent in this general dry cleaning field. Although wholly satisfactory operation results when no filter powder is used, as in the embodiment of the method set forth herein by way of example, the present invention does not preclude the use of filter aids of various kinds where such use is desired.

The filter distillation operation referred to generally in the foregoing is, according to the present invention, intended to be practiced more frequently than the reverse-flush filter cleaning of the prior art, preferably at the end of each day of operation, but its simplicity and efficacy are such as to render it far more desirable and economical than the practice of the prior art in the long run. This greater desirability is also true as between the present invention and the scraping method used where the actual filtering elements are perforated metal plates.

Various other advantages attendant upon the use of the apparatus of the present invention and practice of the novel filtering and distilling method set forth herein will occur to those skilled in this art from a consideration of the following specification and the accompanying drawings which set forth in detail one specific example of apparatus for practicing the present invention. It is to be understood, however, that considerable variation in the apparatus and in the method may be effected without departing from the spirit of the present invention, the scope being limited only as defined in the appended claims.

In the drawings:

Fig. 1 is a general rear elevational view of one form of the apparatus of the present invention;

Fig. 2 is a top plan view thereof; and

Fig. 3 is an end elevational view taken from the lefthand end as viewed in Fig. 1.

In the several figures of the drawing, like characters of reference denote like parts, and the numeral 10 designates generally a conventional colsed cycle dry cleaning machine having a casing 11 which includes a wash chamber 12 having therein a rotatable clothes-containing drum or cylinder 13. The base of the machine includes a tank 14 which comprises a reservoir for receiving cleaning solvent discharging from chamber 12 or returned to tank 14 an any other manner.

The numeral 18 designates generally a filter unit which is one of the various conventional types commonly used in this field. The filter unit, while generally conventional as to the arrangement of the filter bags in the internal filter circuit, is modified as described in the following specification to cooperate in the novel manner taught by the present invention. In the illustration the filter unit is of the vertical cylindrical type, but the principles of the invention apply equally to another common form of filter unit wherein the filter casing is generally rectangular. In the present instance the solvent to be filtered enters the upper portion of the filter unit and issues from the upper portion after filtration. In variant forms the filters have their inlet and outlet conduits at the upper and lower or lower and upper portions. This again is of no significance as far as the construction and operation of the present invention is concerned.

The conduits and piping shown in the drawing represent an actual practical cleaning machine and filter installation and include the provision of conduits, bypasses, and valves which are useful in operating the system in various ways with which the present invention is not concerned. The system will be described only insofar as the present novel operation is concerned.

A pump motor 20 is disposed on the base tank 14 of the dry cleaning machine and operates a submerged pump 21 whose discharge side empties into a conduit 22 which leads to two branch passages 23 and 24. So far as the operation of the present system is concerned, both as to cleaning and filtering operation and as to filter scavenging operation, a valve 25 remains closed and thus conduit 24 may be disregarded as an alternative outlet from pump 21. The conduit 23 extends to the upper portion of filter unit 18 and connects with the inlet side of the filter apparatus per se.

The outlet side of the filter apparatus, in the present illustration, discharges into two conduits 26 and 27, which connect with a common conduit 28 which discharges into the wash chamber of the dry cleaning machine. Conduit 28 is provided with a manual valve 30. During normal dry cleaning operation pump 20 continuously delivers more or less soiled solvent to the filter unit and after passing through the filter the solvent discharges therefrom to the wash chamber 12 by way of conduit 28, the valve 30 being open during such periods.

The portion of the interior of filter unit 18 which comprises the normal intake side and which is in communication with conduit 23 is also in communication with a conduit 35 which leads from the upper end of the filter unit and discharges into a conventional water-cooled condenser 36 which may be of the vertical tube type. Condenser 36 has a lower inlet 40 for cooling water and an upper outlet 41 for discharging the water.

It is to be understood that the usual practice in a filter of the kind here contemplated is to use a series of vertical screens as supports for filter bags with a filter bag drawn over each screen and the mouths of several bags meeting a common header, so that the header and the bags cooperate to divide the interior of the filter into an inlet side and an outlet side. The inlet side comprises generally the outer surfaces of the several bags, and these surfaces are the ones which are coated with filter powder, the inner sides of the bags, on the other hand, comprising the outlet side of the filter during normal filtering operation. The use of filter powder as a filter aid in filters of this kind is considered essential to proper operation in this field.

Referring to Fig. 1, the lower part of the filter unit contains the usual sludge box 44 which receives material falling or precipitating from the inlet side of the filter. In normal filter operation reverse flushing of the filter unit washes the filter powder and accumulated dirt from the surfaces of the filter bags down to the sludge box 44. An access door 45 permits the removal of sludge box 44 for emptying and cleaning.

In the present instance the filter 18 is provided at its lower portion with a double wall arrangement which provides a cup-shaped steam chamber 46 which, in the present instance, extends across the bottom surface of the filter unit and upwardly a short distance along its side. Live steam is fed into this jacket through a steam connection 50 and discharges therefrom through an outlet steam connection 51.

In addition to the steam jacket for distilling solvent, the present apparatus is also novel in the provision of a sparger tube 53 which extends into the base of the filter unit and into sludge box 44. Sparger tube 53 has a series of orifices and an external steam connection 54, so that live steam may be sprayed into sludge box 44, usually after the normal distillation contemplated by the present invention.

While the present filter is shown as having a steam jacket, it is within the contemplation of the present invention to supply the heat for distillation by providing steam coils in the base of the filter unit for the same purpose or in any other desired manner.

After a normal period of dry cleaning operation and when it is decided to clean or strip the filter, valve 30 in the discharge line from the filter unit is closed and a manual valve 57 in conduit 23, which comprises the normal inlet conduit to the filter unit, is likewise closed and a manual valve 60 in conduit 35 is opened, so that the only outlet from the interior of the filter unit is through conduit 35 to the top of condenser 36.

The discharge of condensed liquid from the lower end of condenser 36 may pass to a separate conventional gravity type water-separator to separate water from the perchlorethylene and direct the latter back to tank 14. In the present instance the bottom of the condenser 36 itself serves as a gravity separator and condensed water is taken from the condenser by way of a conduit 63 and condensed perchlorethylene is taken from separator 36 by way of a lower conduit 64 for return to tank 14, perchlorethylene being heavier than water.

As stated previously herein, it is desirable to avoid distilling all of the solvent and before distillation a normally closed valve 69 in a conduit 68 may be temporarily opened to drain a predetermined part of the solvent in the filter back to tank 14. Conduit 68 connects with the inlet side of filter 18.

The apparatus and method of the present invention have thus far been described as used with what are known as synthetic solvents of which perchlorethylene is representative. The same procedure may be followed where petroleum solvents are used, but because of the higher boiling points of petroleum solvents, it is advisable to distill the filter contents under reduced pressure, so that distillation may be effected at a temperature lower than the normal boiling point of the petroleum solvents. This may be effected by merely providing a vacuum connection to the inlet side of the filter, with suitable valve means for activating the vacuum connection only during periods of distillation. A more convenient apparatus is provided if the vacuum connection is made to the condenser 36 by connection with that portion of the interior of condenser 36 which contains and conducts the solvent fumes.

The foregoing discussion of the operation of the present invention has had reference particularly to closed cycle dry cleaning machines by way of example, but where the washing step of the dry cleaning operation is carried on in one machine, the contents being transferred to an entirely separate machine for extraction, the filter arrangement and method of the present invention may be employed with equal effect in association with the machine in which such washing step is performed.

What is claimed is:

1. Apparatus for cleaning fabrics and the like with volatile solvents comprising a wash chamber having therein a rotatable container for the articles to be cleaned, a tank for receiving soiled solvent from said chamber, and a filter apparatus having an inlet portion for receiving soiled solvent and an outlet portion for discharging filtered solvent, means establishing fluid communication between said chamber and said tank and between said tank and the inlet portion of said filter and fluid displacement means in cooperation therewith, a conduit from the discharge portion of said filter to said wash chamber, and a second conduit from the inlet portion of said filter to said tank, said second conduit having means therein for condensing volatile solvents, valve means in the communication means between said tank and the inlet portion of said filter and in each of said conduits, and heat exchange means in said filter unit for distilling solvents therefrom to said condensing means.

2. Apparatus for cleaning fabrics and the like with volatile solvents comprising a wash chamber having therein a rotatable container for the articles to be cleaned, a tank for receiving soiled solvent from said chamber, and a filter apparatus having an inlet portion for receiving soiled solvent and an outlet portion for discharging filtered solvent, means establishing fluid communication between said chamber and said tank and between said tank and the inlet portion of said filter and fluid displacement means in cooperation therewith, a conduit from the discharge portion of said filter to said wash chamber, and a second conduit from the inlet portion of said filter to said tank, said second conduit having means therein for condensing volatile solvents, valve means in the communication means between said tank and the inlet portion of said filter and in each of said conduits, heat exchange means in said filter unit for distilling solvents therefrom to said condensing means, and steam spray means in said filter and operable to dilute the residue of distillation and extend distillation.

3. Apparatus for cleaning fabrics and the like with volatile solvents comprising a mechanical washer, a filter apparatus having an inlet portion connected for receiving soiled solvent from said washer and an outlet portion connected for returning filtered solvent to said washer, a normally closed independent conduit from the inlet portion of said filter to said washer, said independent conduit having means therein for condensing volatile solvents, valve means operable to open said independent conduit and close the other connections between said washer and said filter, a second normally closed independent conduit from the inlet portion of the filter to the washer for selectively returning unfiltered and undistilled solvent to the washer, and heat exchange means in said filter unit for distilling solvents therefrom to said condensing means.

4. Apparatus for cleaning fabrics and the like with volatile solvents comprising a mechanical washer, a filter apparatus having an inlet portion connected for receiving soiled solvent from said washer and an outlet portion connected for returning filtered solvent to said washer, a normally closed independent conduit from the inlet portion of said filter to said washer, said independent conduit having means therein for condensing volatile solvents, valve means operable to open said independent conduit and close the other connections between said washer and said filter, heat exchange means in said filter unit for distilling solvents therefrom to said condensing means, and steam spray means in said filter and operable to dilute the residue of distillation and thus extend the distillation of solvent.

5. Apparatus for cleaning fabrics and the like with volatile solvents comprising a mechanical washer, a filter apparatus having an inlet portion connected for receiving soiled solvent from said washer and an outlet portion connected for returning filtered solvent to said washer, a normally closed independent conduit from the inlet portion of said filter to said washer, said independent conduit having means therein for condensing volatile solvents and for separating water from the condensate, valve means operable to open said independent conduit and close the other connections between said washer and said filter, and heat exchange means in said filter unit for distilling solvents therefrom to said condensing means.

6. Apparatus for cleaning fabrics and the like with volatile solvents comprising a mechanical washer, a filter apparatus having an inlet portion connected for receiving soiled solvent from said washer and an outlet portion connected for returning filtered solvent to said washer, a normally closed independent conduit from the inlet portion of said filter to said washer, said independent conduit having means therein for condensing volatile solvents and for separating water from the condensate, valve means operable to open said independent conduit and close the other connections between said washer and said filter, and heat exchange means in said filter unit for distilling solvents therefrom to said condensing means, and steam spray means in said filter and operable to dilute the residue of distillation and thus extend the distillation of solvent.

References Cited in the file of this patent

UNITED STATES PATENTS

| Number | Name | Date |
| --- | --- | --- |
| 932,550 | Hopkins et al. | Aug. 31, 1909 |
| 1,669,235 | Fenton | May 8, 1928 |
| 1,795,006 | Boiney | Mar. 3, 1931 |
| 1,843,657 | Welles et al. | Feb. 2, 1932 |
| 2,140,623 | Hetzer | Dec. 20, 1938 |
| 2,301,803 | Davis | Nov. 22, 1942 |